March 25, 1924.
I. A. WEAVER
TIRE INFLATION TESTING APPLIANCE
Filed March 1, 1920
1,487,771
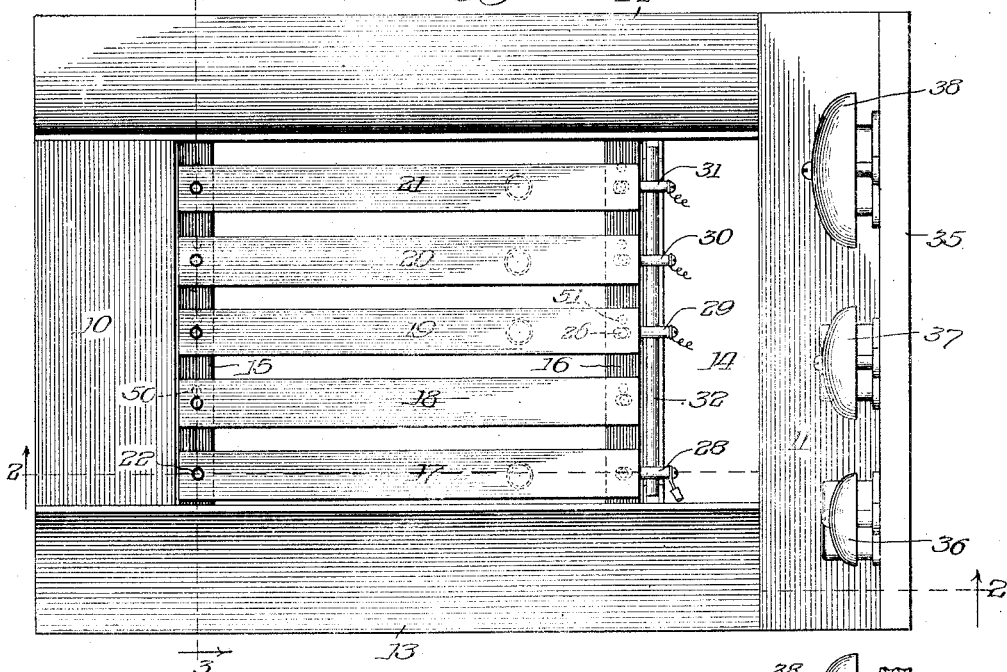
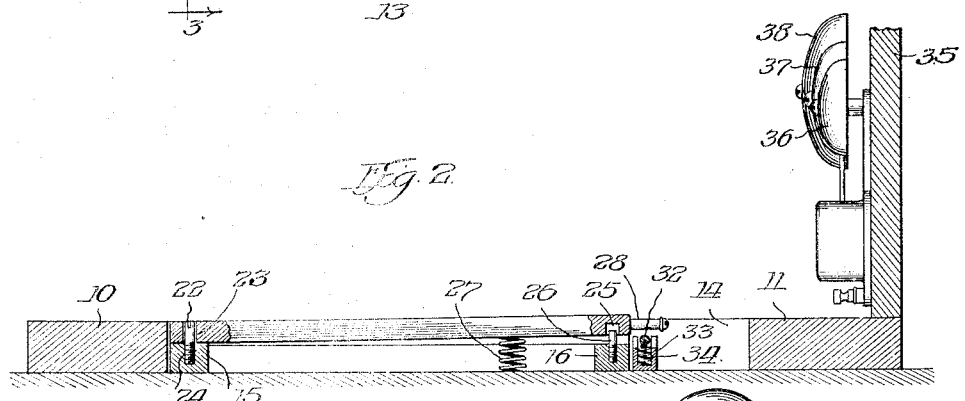
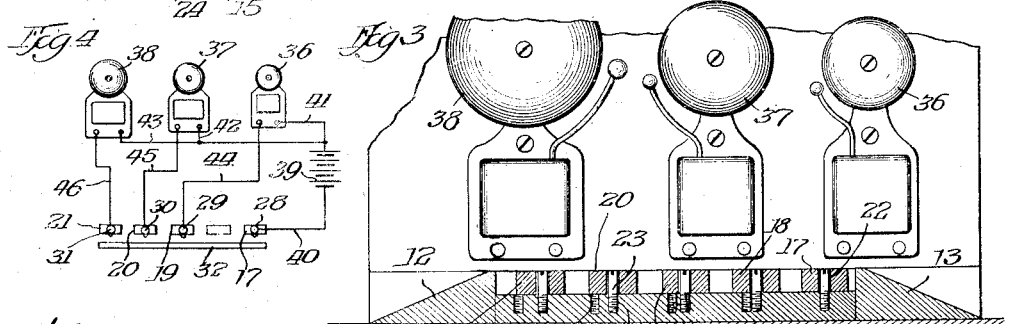
Witness:
Inventor:
Ira A. Weaver
By Walter M. Fuller Patented Mar. 25, 1924.

1,487,771

UNITED STATES PATENT OFFICE.

IRA A. WEAVER, OF SPRINGFIELD, ILLINOIS, ASSIGNOR TO THE WEAVER MANUFACTURING COMPANY, OF SPRINGFIELD, ILLINOIS, A CORPORATION OF ILLINOIS.

TIRE-INFLATION TESTING APPLIANCE.

Application filed March 1, 1920. Serial No. 362,396.

*To all whom it may concern:*

Be it known that I, IRA A. WEAVER, a citizen of the United States, residing at Springfield, in the county of Sangamon and State of Illinois, have invented certain new and useful Improvements in Tire-Inflation Testing Appliances, of which the following is a specification.

My invention concerns means for ascertaining whether or not the air-pressure in pneumatic tire-casings is adequate or whether the tire is insufficiently inflated. I propose to do this by automatically measuring the length of the flat contact of the tire with the ground and sounding an alarm if such measurement shows under-inflation. It is well-known that when a tire of a given size and bearing a known load has its inner tube under proper air-pressure, it has a certain length of flat surface resting on the ground, and as the degree of inflation or air-pressure decreases this length increases. It is the aim of this invention to take advantage of this feature and determine whether the inflation is sufficient or not by merely driving the wheel equipped with the tire to be tested over an appliance incorporating this invention. Such device is equipped with a signal, audible or visual, which automatically indicates the air condition of the tire, giving suitable warning if under-inflation exists.

A preferred embodiment of the invention comprises in its simplest form a pair of parallel depressible bars separated from one another by a fixed bar, the movable bars being normally held slightly raised or elevated by suitable springs and over which the vehicle-wheel with the pneumatic tire is rolled, such bars being associated with a signal and so spaced apart that if both are depressed at the same time the signal will be sounded or displayed, as the case may be, indicating under-inflation, whereas, if no alarm or signal operates, the air-pressure is adequate.

To enable those skilled in this art to have a full and complete understanding of this invention, both from structural and functional standpoints, I have illustrated a preferred embodiment of the same in the accompanying drawing, which should be considered in connection with the following detailed description, and throughout the several views of which like reference characters refer to the same parts.

In this drawing:

Figure 1 is a plan view of the appliance;

Figure 2 is a vertical cross-section on line 2—2 of Figure 1, the parts being viewed in the direction indicated by the arrows;

Figure 3 is a vertical section on line 3—3 of Figure 1, the parts being viewed as specified by the arrows; and Figure 4 is a diagram of the electrical circuits.

Referring to the several figures of the drawing, it will be perceived that the appliance comprises a rather shallow or thin frame composed of two end plates or boards 10 and 11 and a pair of oppositely beveled or sloping lengthwise boards 12 and 13, the inclined top faces of which facilitate the travel of the wheel up on to the device and its rolling off of the same. These four elements border or form a central rectangular opening 14 accommodating across one end a supporting strip 15 and another parallel strip 16 near the opposite end.

Five, or any other suitable number of spaced, parallel bars 17, 18, 19, 20, and 21 with flat top surfaces are received in this opening, each having one apertured end held in position on the strip 15 by a screw 22 fitted in a hole 23 through the bar and screwed into a threaded hole 24 of the underlying supporting strip. Thus, these ends of the bars are held against displacement, but the holes of the bars are somewhat larger than their screws to permit the bars to have a slight vertical rocking movement thereon, these end mountings really constituting fulcrums or hinge connections for the bars.

Each bar on its under side above the companion supporting strip 16 has a lengthwise groove or slot 25 receiving a stationary guide-pin 26 upstanding from the member 16 and by these means such ends of the bars are held in position, that is, with the bars parallel to one another, but with freedom of up and down movement by reason of their rocking mountings at their other ends.

Each bar, except the second one characterized 18, also has beneath it a coil expansion spring 27 bearing against its under face which normally holds it slightly elevated as shown in Figure 2.

Such second bar 18 is merely a fixed spacer or intermediate support resting at all times on the two supporting strips 15 and 16 and may be conveniently mounted thereon like the other bars except that it has no lifting spring beneath it.

Bars 17, 19, 20, and 21 each have at their right-hand ends, as viewed in Figures 1 and 2, a projecting electric terminal or contact 28, 29, 30, and 31, respectively, all located above a common rod terminal or contact 32 in a channel guide 33 and resting on supporting springs 34 at its opposite ends. When any of these hinged bars are raised, as they normally are, their contacts are out of engagement with the element 32, but if any bar is depressed, as by the pneumatic-tire equipped wheel rolling over it, its contact touches the underlying terminal and completes an electric circuit therethrough, as described below.

The board 11 is furnished with an upright wall or panel 35 on which, in the present instance, three electric-bells 36, 37, and 38, desirably of different sizes and hence of varying tones or sounds, are mounted in the usual manner.

As is fully illustrated in Figure 4, the system comprises an electric-battery 39 having one terminal connected by a wire 40 to the contact 28 of the first bar 17, and the opposite terminal of the battery is connected by wires 41, 42, and 43, to one binding post of each of the three electric-bells. The other terminal of the bell 36 by means of a wire 44 is connected to the contact 29 of the hinged bar 19; in similar manner, the second binding-post of the bell 37, by means of a wire 45, is connected to the contact 30 of the depressible bar 20; and in like manner the remaining binding-post of bell 38 is connected to the contact 31 of the hinged bar 21 by means of a wire 46. The common rod contact 32, normally has no electrical connection with any of these parts, but merely becomes an element of the circuit upon the depression of bar 17 and any one or more of the bars 19, 20 and 21.

Ordinarily, the four hinged or fulcrumed bars 17, 19, 20 and 21, are held slightly elevated or raised from bar 16 by their respective underlying springs, thus maintaining their electric contacts out of engagement with the companion or complementary contact 32. Hence all portions of the electric circuit are open. If a vehicle, the tire of whose wheel is to be tested, is steered to run the wheel and tire over the device by rolling up the small incline of the board or plate 13, as soon as such wheel rolls on to bar 17, the latter will be depressed the small amount permitted by the stop-strip 16, causing the contact of the two terminals 28 and 32, which, however, does not complete or close any entire electric circuit. When, during the progress of its travel, the wheel rolls on to bar 18 nothing happens as this is merely a space or supporting bar. If, however, the flat contact surface of the tire is of sufficient length to simultaneously depress the two bars 17 and 19, then the electric circuit (39, 40, 28, 32, 29, 44, 36, 41) will be closed through the electric-bell 36, which will be rung. If these bars are so spaced apart that such length of contact represents under-inflation of a tire of the size under consideration, the sounding of such alarm informs the driver that the tire of that wheel requires pumping up.

The next bar 20 is employed for use with larger sizes of tires. When a vehicle-wheel with such a size of tire is run over the device, the ringing of bell 36 is ignored, because it is not applicable to such size of tire, but if bell 37 rings, which will be accompanied by a simultaneous ringing of bell 36, such an occurrence indicates that the tire is under-inflated.

Bar 21 is employed for still larger tires, such as truck tires. When such a wheel traverses the apparatus under-inflation will be indicated by the ringing of all three bells, and if bells 36 and 37 only ring, the tire has proper air pressure.

It is wholly immaterial in which direction the wheel crosses the bars, because no circuit or circuits will be closed unless the master-bar 17 is depressed. If, for example, with the smallest tire the bar 19 rises before the bar 17 is depressed, no signal will be sounded.

The amount of load in the vehicle is not to be ignored because a certain length of tire contact with the ground when the vehicle is fully loaded might be quite proper, whereas, the same length of contact with the automobile unloaded might indicate that the tire needs pumping up.

Of course, the movable bars will always be depressed when a vehicle wheel runs over them but the condition of the tire is automatically ascertained by the co-relation of the periods of depression of the several test bars.

To permit lateral adjustment of these test bars so that they may be used with tires of different sizes or of different kinds, each hole 24, except that for bar 17, in the strip 15 which accommodates one of the screws 23 has adjacent to it one or more other holes 50 in which the screw may be fitted to give the bar a different position, and at the other end of the bars supplementary holes 51 in alignment with the holes 50 are provided for adjusted positions of the guide-pins 26. Thus, the bars may be spread apart laterally or caused to lie nearer to one another to meet the particular service conditions of the place of installation.

It will be understood by those skilled in this art that this device, although extremely simple in construction and principles of operation, will effectively and efficiently test the inflation of tires without the driver of the automobile leaving his seat, and the device includes no parts which are likely to become damaged or injured in service or put out of commission during ordinary usage. Although audible electric-signals have been shown and described in connection with the operation of this apparatus, it is to be understood that other indicating or alarm devices may be used with much the same reliability and effectiveness.

This invention is not limited or restricted to this particular embodiment nor to its precise and exact details of construction because these may be varied within comparatively wide limits without departure from the heart and essence of the invention and without the sacrifice of any of its substantial benefits and advantages. For example, it is not essential that the top faces of the several bars shall be in the same plane nor is it necessary that the surface of the tire measured to ascertain the air-pressure shall be a plane surface. It will be apparent also that the appliance and its plurality of signals or indicating devices may be used to denote or designate different degrees of inflation of the tire undergoing the test. With a slightly different arrangement of electrical circuits one bell only may be caused to ring when a tire, regardless of its size, shows under-inflation, such modification being readily apparent to electricians.

I claim:

1. In a pneumatic tire-inflation testing appliance of the character described, the combination of vehicle-wheel tire-inflation indicating means, and means controlled by the lineal contact of the tested tire therewith and moved by the weight of the tire and its load to operate said indicating means.

2. In a pneumatic tire-inflation testing appliance of the character described, the combination of vehicle-wheel tire-inflation indicating means, and means controlled by the lineal contact of the tested tire therewith governing the operation of said indicating means during the rolling of the tested tire thereover.

3. In a pneumatic tire-inflation testing appliance of the character described, the combination of vehicle-wheel tire-inflation indicating means, and a plurality of movable elements influenced by the lineal contact of the tested tire therewith, means to operate said indicating means only when such plurality of elements are simultaneously moved by the tire, substantially as described.

4. In a pneumatic tire-inflation testing appliance of the character described, the combination with vehicle-wheel tire-inflation indicating means, a plurality of movable spaced elements controlled by the lineal contact of the tested tire therewith, and means constructed to operate said indicating means only when such plurality of elements are simultaneously moved by the tested tire.

5. In a pneumatic tire-inflation testing appliance of the character described, the combination of a signal, and means depressed by a tire to operate such signal only when the length of the contact with the ground of the tire undergoing test is a predetermined amount, substantially as described.

6. In a pneumatic tire-inflation testing appliance of the character described, the combination of a pair of spaced depressible bars, means normally holding said bars elevated, a signal, and means to operate said signal when a tired vehicle-wheel bearing on said bars causes their simultaneous depression, substantially as described.

7. In a pneumatic tire-inflation testing appliance of the character described, the combination of a pair of spaced depressible bars, means normally holding said bars elevated, a support between said bars, a signal, and means to operate said signal when a tired vehicle-wheel bearing on said bars and support causes the simultaneous depression of said bars, substantially as described.

8. In a pneumatic tire-inflation testing appliance of the character described, the combination of an electric-circuit, a signal in said circuit, a pair of electric circuit closers in said circuit, and a pair of spaced movable bars adapted to simultaneously close said circuit closers when the tire of a vehicle-wheel rolled over them is sufficiently deflated to cause it to engage both bars at the same time, substantially as described.

9. In a pneumatic tire-inflation testing appliance of the character described, the combination of an electric-circuit, a signal in said circuit, a pair of electric circuit closers in said circuit, a pair of spaced depressible normally-elevated bars, a support between said bars, said bars being adapted to simultaneously close said circuit closers when the tire of a vehicle-wheel rolled over the bars and support is sufficiently deflated to cause it to depress both bars at the same time, substantially as described.

10. In a pneumatic tire-inflation testing appliance of the character described, the combination of a master depressible normally-elevated bar, a space bar beside said master bar, a plurality of depressible, normally-elevated bars on the other side of said space-bar, and signal means associated with said depressible bars and adapted to be operated upon simultaneous depression of said master and at least one of the other bars by a tired vehicle-wheel bearing thereon, substantially as described.

11. In a pneumatic tire-inflation testing appliance of the character described, the combination of a master depressible normally-elevated bar, a space-bar beside said master bar, a plurality of depressible, normally-elevated bars on the other side of said space-bar, signal means associated with said depressible bars and adapted to be operated upon simultaneous depression of said master and at least one of the other bars by a tired vehicle-wheel bearing thereon, and means permitting lateral adjustment of at least a portion of said bars, substantially as described.

IRA A. WEAVER.